United States Patent
von der Ohe

[11] 3,876,029
[45] Apr. 8, 1975

[54] WHEEL SUSPENSION
[75] Inventor: Manfred von der Ohe, Stuttgart, Germany
[73] Assignee: Daimler-Benz Aktiengesellschaft, Stuttgart, Germany
[22] Filed: Apr. 23, 1973
[21] Appl. No.: 353,645

[30] Foreign Application Priority Data
Apr. 24, 1972 Germany............................ 2220006

[52] U.S. Cl........... 180/73 D; 280/124 A; 267/20 A
[51] Int. Cl................................................ B62d 7/00
[58] Field of Search.. 180/73 R, 73 C, 73 D, 73 TL, 180/73 TT; 280/124 A; 267/20 A

[56] References Cited
UNITED STATES PATENTS
3,257,121  6/1966  Muller ............................ 267/20 A
3,573,882  4/1971  Van Winsen .................... 280/124 A
3,620,548  11/1971  Van Winsen .................... 267/20 A
3,759,542  9/1973  Loffler............................ 280/124 A

*Primary Examiner*—Philip Goodman
*Assistant Examiner*—John A. Carroll
*Attorney, Agent, or Firm*—Craig & Antonelli

[57] ABSTRACT

An independent wheel suspension, especially for motor vehicles, which includes a lower and an upper guide member and a wheel carrier guided by these guide members as a coupler; a track link steering arm is rigidly arranged at the wheel carrier and is adapted to be steered by way of a track rod engaging at the track link steering arm; the track rod is thereby pivotally connected at its end opposite the track link steering arm at one of the guide members.

47 Claims, 5 Drawing Figures

PATENTED APR 8 1975  3,876,029
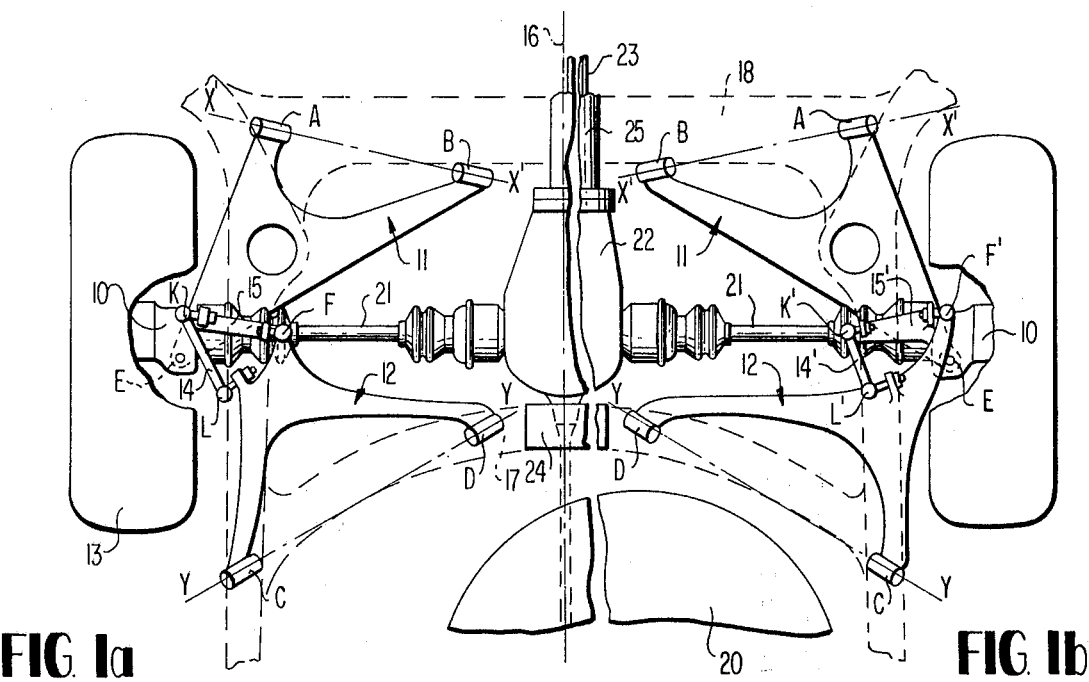
FIG. 1a  FIG. 1b
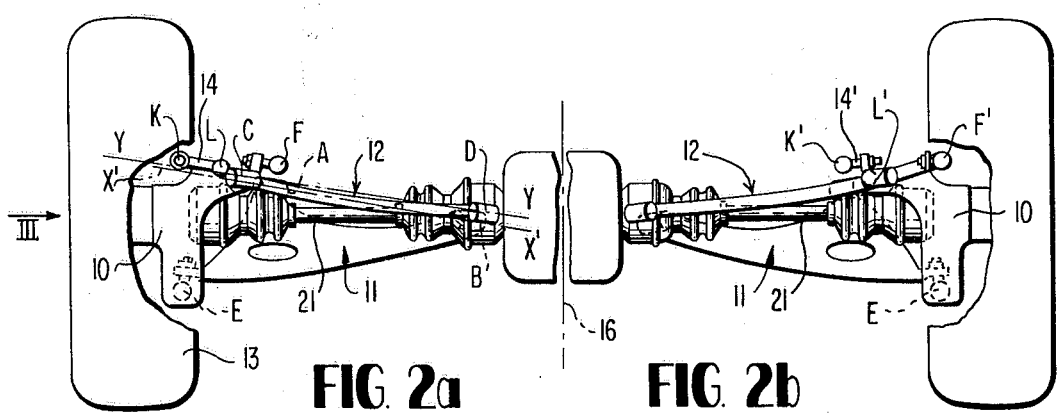
FIG. 2a  FIG. 2b
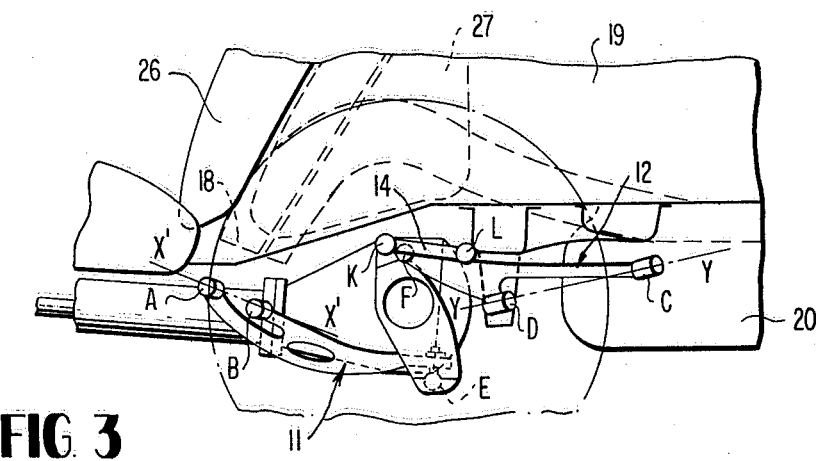
FIG. 3

WHEEL SUSPENSION

The present invention relates to an independent wheel suspension, especially for motor vehicles with a lower guide member and an upper guide member and a wheel carrier guided by the guide members as coupler, at which is rigidly mounted a track link steering arm and which is steerable by way of a track rod engaging at the track link steering arm.

In one known wheel suspension of this type for the rear wheels of a motor vehicle, the track rods are mounted respectively at the vehicle frame. This requires for the exact maintenance of a predetermined wheel track that the points of pivotal connection of the guide members on the frame-side accurately assume the predetermined design position with respect to the point of pivotal connection of the track rod on the frame side and also maintain the same, and more particularly, independently of eventual manufacturing tolerances of the vehicle frame and possible displacements of the respective points of pivotal connection on the frame-side of the guide member and the track rod with respect to one another by reason of elastic elements provided in the support with the respective frame. However, this is hardly attainable in practice without sacrifice in driving comfort or without auxiliary constructions connected with relatively high expenditures.

Departing from this recognition, the present invention is concerned with the task to so construct an independent wheel suspension of the aforementioned type that the described disadvantages are avoided with a comparatively simple construction of the wheel suspension.

This is achieved according to the present invention in that the track rod is pivotally connected at its end opposite the track link steering lever on a guide member. Initially those error sources are eliminated by the pivotal connection of the track rod at the guide member which exist in the prior art constructions already due to the tolerances unavoidable in the vehicle manufacture as regards the location of the points of pivotal connection on the frame-side of the track rod and the associated guide member. Furthermore, with the solution according to the present invention a yielding support of the guide member respectively connected with the track rod is possible in at least one of its points of pivotal connection on the frame-side without disadvantageous effects on the track steering, and the elastic support elastic in the driving direction which is essential for the driving comfort can therefore be achieved without interposition of an auxiliary bearer, on which are arranged the points of pivotal connection of track rod and guide member on the frame side and which, in its turn, is elastically supported in the driving direction. Furthermore, as a result of the pivotal connection of the track rod at the guide member a larger base is available for the respective guide member carrying the point of pivotal connection of the track rod on the frame side and a more light-weight construction also results as compared to constructions with separate auxiliary bearers even if a bearer is welded into the vehicle frame as securing member for the points of pivotal connection of the guide member on the frame-side.

In realization of the present invention it is appropriate if the point of pivotal connection of the guide member at the wheel carrier, at which is pivotally connected the track rod, is located approximately at the height of the pivotal connection of the track rod at the track link steering level. A movement curve is attainable thereby during the spring movements for the point of pivotal connection of the track rod at the track link steering lever, which is similar to the movement curve which is described by the point of pivotal connection of the guide member, on which is pivotally connected the track rod.

This is true in particular if according to the present invention the point of pivotal connection of the track rod at the track link steering lever and the point of pivotal connection of the guide member, at which the track rod is pivotally connected, at the wheel carrier are located at the same height and if, according to a further feature of the present invention, the point of pivotal connection of the track rod at the track link steering lever and the point of pivotal connection of the guide member, at which is pivotally connected the track rod, at the wheel carrier are located in a single vehicle cross plane. This is so as with such a location of the mentioned points of pivotal connection, the point of pivotal connection of the track rod provided at the track link steering lever describes during spring movements an essentially planar movement curve which enables the determination of a location for the point of pivotal connection of the track rod at the guide member, which is particularly favorable as regards the aimed-at track steering with smallest possible track change.

A location for the point of pivotal connection of the track rod at the track link steering lever which, in relation to the wheels belonging to an axle, produces at least only symmetrical track changes and in which any track changes, that might possibly occur during spring movements, accordingly do not have any steering effect as a consequence, can be achieved according to the present invention in that, in relation to a fixed coordinate system fixed with respect to the respective guide member at which is pivotally connected the track rod, the point of pivotal connection of the track rod at the guide member is located in a plane which is defined in the design or normal base position by the point of pivotal connection of the track rod at the track link steering lever and by a straight line—the so-called ideal straight line—which is disposed perpendicularly to a plane defined by the point of pivotal connection of the track rod at the track link steering lever in its position corresponding to different spring positions, and extends through this plane in the center point of the arc of the curve which is described by the point of pivotal connection of the track rod at the track link steering lever during spring movements.

A track steering, in which the track, a term which refers herein both to toe-in and toe-out, remains unchanged during spring movements and in which consequently no track changes, i.e., neither toe-in nor toe-out changes occur, during spring movements, can be achieved in a construction according to the present invention in that the point of pivotal connection of the track rod at the guide member is located on the aforementioned ideal straight line.

It is appropriate for the wheel suspension according to the present invention to construct at least one of the respective guide members, guiding the wheel carrier as a coupler, as triangular guide member though it is preferable to construct both of these guide members as triangular guide members. In that connection, the guide members may extend in the same or in opposite directions in relation to the longitudinal direction of the vehicle. If they have opposite directions of extension then it is appropriate if, in relation to the longitudinal direction of the vehicle, the lower guide member is provided as the forward guide member. The upper guide member then serves as rear guide member in relation to the driving direction.

The track rod can be pivotally connected in the construction according to the present invention at the lower as well as at the upper guide member. Corresponding to the point of pivotal connection of this guide member at the wheel carrier, the point of pivotal connection of the track rod at the track link steering lever then has within the scope of the present invention preferably a location, in which it lies at the same height as the point of pivotal connection of the guide member at the wheel carrier and in a cross plane together with the same.

Within the scope of the solution according to the present invention the point of pivotal connection of the track rod at the track link steering lever may be located, as viewed in plan view, at a larger distance from the vehicle longitudinal center plane than the point of pivotal connection of that guide member at the wheel carrier, at which is pivotally connected the track rod. Furthermore, it is also possible according to the present invention to arrange the point of pivotal connection of the track rod at the track link steering lever, as viewed in plan view, at a smaller distance from the vehicle longitudinal center plane than the point of pivotal connection of that guide member at the wheel carrier, at which is pivotally connected the track rod.

Accordingly, it is an object of the present invention to provide a wheel suspension for motor vehicles which avoids by simple means the aforementioned short comings and drawbacks encountered in the prior art.

Another object of the present invention resides in an independent wheel suspension which assures an accurate maintenance of the preselected wheel track.

A further object of the present invention resides in an independent wheel suspension which is characterized by simplicity of its construction and excellence in driving behavior.

A still further object of the present invention resides in an independent wheel suspension for motor vehicles which permits the wheel track to be maintained accurately under all driving conditions regardless of manufacturing tolerances of the vehicle frame and without sacrifice in driving comfort and/or without the need of any auxiliary structures involving relatively large expenditures.

Another object of the present invention resides in an independent wheel suspension which minimizes the parts necessary therefor and thus results in a more light-weight construction.

These and further objects, features and advantages of the present invention will become more apparent from the following description when taken in connection with the accompanying drawing which shows, for purposes of illustration only, one embodiment in accordance with the present invention, and wherein:

FIGS. 1a and 1b are somewhat schematic partial plan views of one half of a symmetrical wheel suspension according to the present invention for a driven vehicle rear axle, whereby two different possibilities for the arrangement of the track rod steering the wheel carrier as coupler are illustrated in FIGS. 1a and 1b;

FIGS. 2a and 2b are rear elevational views of a wheel suspension according to FIGS. 1a and 1b respectively, illustrating again the two different possibilities of the track rod arrangements for the two axle sides; and FIG. 3 is a partial side elevational view of the wheel suspension for the left wheel side as viewed in the direction of the arrow III in FIG. 2a whereby of the wheel disposed in front of the wheel suspension, as seen in the view according to the arrow III, only the circumference is indicated in dash and dot lines.

Referring now to the drawing, wherein like reference numerals are used throughout the various views to designate like parts, in the wheel suspension illustrated in FIGS. 1 to 3 the wheel carriers which are designated by reference numeral 10, are each guided as coupler by guide members generally designated by reference numerals 11 and 12, of which respectively the guide member 11 serves as forward and lower guide member and the guide member 12 as rear and upper guide member. The guide members 11 and 12 are both constructed in the illustrated embodiment as triangular guide members and possess each two points of pivotal connection on the frame side. In the illustrated embodiment the points of pivotal connection of the guide member 11 on the frame side is designated by A and B while the points of pivotal connection of the guide member 12 on the frame side are designated by C and D. The points of pivotal connection of the guide members 11 and 12 at the wheel carrier 10 are designated by E and F, in the left axle half of FIGS. 1 and 2. Of the points of pivotal connection E and F, the point of pivotal connection E which is coordinated to the forward lower guide member 11, is located at the wheel carrier 10 at the bottom thereof whereas the point of pivotal connection F coordinated to the rear upper guide member 12, is provided at the wheel carrier 10 at the top thereof. A pivot axis for the wheel carrier 10 and for the wheel 13 connected therewith is thereby defined by the points of pivotal connection E and F.

A track rod 14 (FIGS. 1a and 2a) serves for the purpose of steering and controlling the track of the wheel carrier 10 pivotal about the pivot axis determined by the points of pivotal connection E and F; the track rod 14 is mounted at the guide member 12 in a point of pivotal connection L and is connected with the wheel carrier 13 by way of a track link steering arm 15, at which it is connected in a point of pivotal connection K. In the left side modification according to FIGS. 1a and 2a, this point of pivotal connection K is located farther removed from the vehicle longitudinal center plane 16 than the point of pivotal connection F of the rear upper guide member 12, on which is provided the point of pivotal connection L of the track rod 14.

The right side modification according to FIGS. 1b and 2b differs exclusively with respect to the location of the points of pivotal connection F and K, whence far-reachingly the same reference numerals are used also for this embodiment. Only the points of pivotal connection F, K and L as well as the track rod 14 and the track link steering lever 15 are designated by the use of primed reference characters F', K' and L' and 14' and 15' in the modified version of the wheel suspension illustrated in connection with the right wheel of FIGS. 1b and 2b. By reason of the fact that in the right side embodiment of FIGS. 1b and 2b the point of pivotal connection F' on the wheel-carrier side of the rear upper guide member 12 is displaced further outwardly, a more steep, upright position results for the pivot axis determined by the points of pivotal connection E and F' on the wheel carrier side, and additionally, the point of pivotal connection K' between the track rod 14' and the track link steering arm 15' comes to lie nearer to the vehicle longitudinal center plane 16 than the point of pivotal connection F'.

Independently of the fact whether the point of pivotal connection K or K' of the track rod 14 or 14' at the track link steering lever 15 and 15' lies nearer the vehicle longitudinal center plane 16 (FIGS. 1b and 2b) or is located farther removed from this plane (FIGS. 1a and 2a) than the point of pivotal connection F or F' of the guide member 12, on which is pivotally connected the track rod 14 or 14' in the point of pivotal connection L or L', it is appropriate if, as can be seen from FIGS. 1a and 1b, the points of pivotal connection K and F or K' and F' are located respectively approximately in a common vehicle cross plane, and more particularly preferably approximately at the same height. This location of the point of pivotal connection K or K' of the track rod 14 or 14' at the track link steering lever 15 or 15' with respect to the point of pivotal connection F or F' of the guide member 12, at which is pivotally connected the track rod 14 or 14', has as a consequence that during spring movements out of the normal base position, the point of pivotal connection K or K' of the track rod 14 or 14' at the track link steering arm 15 or 15' describes a movement path which is similar to the movement path of the point of pivotal connection F or F' of the guide member 12 at the wheel carrier 10 and like the same, is located at least approximately in a vertical plane. It is possible thereby to so steer the wheel 13 respectively arranged at the wheel carrier 10 by way of the track rod 14 or 14' that no significant track changes occur during spring movements whereby the term "track changes" refers herein both to toe-in changes or to toe-out changes, or that at least no track changes result during spring movements for the wheels 13 belonging to an axle which have as a consequence steering effects. Such steering effects are disagreeable particularly during unidirectional or oppositely directed spring movements and they can be avoided for these types of spring actions in that starting from the normal base position, each wheel 13 is only symmetrically changed in its track during inward and outward spring deflections.

A track steering in which the wheels 13 remain at least nearly unchanged in their track during spring movements, can be attained according to the present invention in that the point of pivotal connection L or L' on the frame side of the track rod 14 or 14' is located on a straight line — the ideal straight line — which, in relation to a coordinate system fixed with respect to the respective guide member, is disposed perpendicular to the plane defined by the point of pivotal connection in its positions corresponding to different spring deflection positions, and extends through this plane in the center point of the curved arc which is described by the point of pivotal connection during spring deflections.

If it is not possible, for example, for constructive reasons, to locate the point of pivotal connection L or L' of the track rod 14 or 14' coordinated to the guide member 12 or 12' on the ideal straight line, then it is appropriate to locate the same in the plane defined in the normal base position by the ideal straight line and the point of pivotal connection K or K' of the track rod 14 or 14' at the track link steering lever 15 or 15' because with such a location of the point of pivotal connection, track changes result but these track changes are symmetrical so that no steering effects are produced during unidirectional or oppositely directed steering movements.

In the illustrated embodiment the guide members 11 and 12 for the right and left embodiments according to FIGS. 1 and 2 have the same location of their points of pivotal connection on the frame side, and therewith also corresponding locations for the axes of rotation $x$—$x$ and $y$—$y$ thereof.

The axis of rotation $x$—$x$ of the forward, lower guide member which is determined by the points of pivotal connection A and B of this guide member on the frame side, is inclined obliquely rearwardly as viewed in plan view (FIG. 1) with an extension thereof directed obliquely downwardly toward the vehicle longitudinal center plane as viewed in rear view (FIG. 2). The axis of rotation $y$—$y$ of the rear upper guide member 12 is determined by the points of pivotal connection C and D thereof on the frame side and is inclined slightly obliquely downwardly toward the vehicle longitudinal center plane (FIG. 2). Furthermore, it extends obliquely forwardly toward the vehicle longitudinal center plane as viewed in plan view (FIG. 1). By reason of the fact that in the solution according to the present invention the track rod 14 or 14' is pivotally connected to the guide member 12, the guide member constructed as triangular guide member can receive a particularly wide base, whence the forces acting in the points of pivotal connection C and D at the frame-side can be kept small. This has a consequence that not withstanding the elastic support in these points, desired for reasons of driving comfort, the forces to be absorbed by the guide member 12 can effect only slight track changes, i.e., toe-in or toe-out changes, whence the directional stability of the vehicle is improved.

The mutually crossing-over arrangement of the axes of rotation $x$—$x$ and $y$—$y$ of the guide members 11 and 12, of which the axes of rotation $x$—$x$ are inclined obliquely rearwardly and downwardly and the axes of rotation $y$—$y$ are inclined obliquely forwardly and downwardly, respectively toward the vehicle longitudinal center plane, enables a construction of the entire wheel suspension which is favorable from a space-saving point of view, and additionally this location of the axes of rotation $x$—$x$ and $y$—$y$ also entails advantages as regards the aimed-at starting and braking, nose-diving support.

If, as can be seen from the left illustration according to FIGS. 1a and 2a, the point of pivotal connection K of the track rod 14 at the track link steering lever 15 is located at a larger distance to the vehicle longitudinal center plane 16 than the point of pivotal connection F of the guide member 12 at the wheel carrier 10, then the point of pivotal connection K of the track rod at the track link steering lever can be moved deeply into the wheel as illustrated which has as a consequence small track rod forces. The arrangement illustrated in the right side of FIGS. 1b and 2b, in which the point of pivotal connection K' of the track rod at the track link steering lever 15' is located nearer the vehicle longitudinal center plane 16 than the point of pivotal connection F' of the guide member 12 at the wheel carrier 10, in contradistinction thereto offers the advantage that a particularly favorable construction of the guide member 12 is possible and that the track rod 14' can be mounted at the guide member 12 in a particularly favorable manner.

By reason of the fact that such a large base width can be given to the guide members 12 in the construction according to the present invention, it is possible, as already explained, to elastically support the guide members 12 in their points of pivotal connection C and D at the frame side without the danger that larger track changes might be caused by the forces to be absorbed by the guide members 12 as a result of the deformation of the elastic support elements in the points of pivotal connection C and D. Consequently, in the solution according to the present invention it is possible to eliminate the auxiliary bearer which is used otherwise and which elastically supported with respect to the frame, whereby the over all construction becomes more lightweight and more simple. However, it is advantageous to provide at the frame a bearer 17 belonging to the frame structure, on which are located the points of pivotal connection C and D of the guide members. It is also advantageous in a corresponding manner to provide a frame bearer 18, on which may be arranged the points of pivotal connection A and B of the lower and forward guide members on the frame side. Such bearers incorporated in the frame structure prove more lightweight compared to separate auxiliary bearers.

In the illustrated wheel suspension which altogether can be constructed very flat, there exists the further possibility to move the luggage space 19 of the vehicle forwardly up to the area of the wheel centers with a flat and plane construction and to arrange the spare wheel 20 below the luggage space 19 in a space-saving manner. The spare wheel 20 or the space accommodating the same is only partially indicated in this figure.

In the illustrated embodiment the wheel suspension according to the present invention is described with reference to a driven axle in which the wheels 13 are drivingly connected by way of wheel-drive-shafts 21 with a differential gear 22, from which a cardan shaft 23 leads to an engine disposed, for example, in the front area of the vehicle and not illustrated herein. The differential gear 22 is also supported in its rearward area with respect to the bearer 17, as indicated at 24, and for purposes of support and bracing of the driving reaction moment introduced by the cardan shaft, the housing of the differential gear 22 is non-rotatably connected with respect to the engine by way of a tubular member 25 whereby the cardan shaft 23 extends through the tubular member 25.

The tank 27 is located in the illustrated embodiment between the luggage space indicated by reference numeral 19 and the seats 26 only indicated schematically and disposed in front of the axle, and more particularly the tank 27 is located directly above the axle.

Differing from the illustrated embodiment it is, of course, also possible within the scope of the present invention to coordinate the track rod steering system to the lower guide member 11 whereby the point of pivotal connection of the track rod at the track link steering lever is then of course located at the height of the point of pivotal connection of the lower guide member at the wheel carrier. Such a modification of the embodiment of the present invention is, of course, within the scope of the present invention.

Even though two different versions for the track rod arrangement are shown in FIGS. 1a and 1b, it is understood that in practice, the suspension used for a given axle will use the same track steering system in connection with both axle halves.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. An independent suspension with guide means and wheel carrier means guided by said guide means as coupler, a track link steering lever means at the wheel carrier means, said wheel carrier means being steerable by way of a track rod means engaging at the track link steering lever means, the track rod means being pivotally connected at the end thereof opposite the track line steering lever means at one of the guide means wherein, in relation to a coordinate system fixed with respect to said one guide means, the point of pivotal connection of the track rod means at said one guide means is located in a plane which is defined in the normal base position by the point of pivotal connection of the track rod means at the track link steering lever means and a straight line which is disposed perpendicular to a plane defined by the point of pivotal connection of the track rod means at the track link steering lever in its position corresponding to the different spring positions and extends through said last mentioned plane in the center point of the curved path which is described by the point of pivotal connection of the track rod means at the track link steering lever means during spring movements.

2. A wheel suspension according to claim 1, characterized in that the track link steering lever means is fixedly arranged at the wheel carrier means.

3. A wheel suspension according to claim 2, characterized in that said guide means include upper and lower guide means.

4. A wheel suspension according to claim 3, characterized in that the point of pivotal connection of said one guide means at the wheel carrier means is located at least approximately at the height of the pivotal connection of the track rod means at the track link steering lever means.

5. A wheel suspension according to claim 4, characterized in that the point of pivotal connection of the track rod means at the track link steering lever means and the point of pivotal connection of said one guide means at the wheel carrier means are located at essentially the same height.

6. A wheel suspension according to claim 4, characterized in that the point of pivotal connection of the track rod means at the track link steering lever means and the point of pivotal connection of said one guide means at the wheel carrier means are located substantially in a single vehicle transverse plane.

7. A wheel suspension according to claim 6, characterized in that the point of pivotal connection of the track rod means at said one guide means is located on said straight line.

8. A wheel suspension according to claim 7, characterized in that at least one of said guide means is constructed as triangular guide member.

9. A wheel suspension according to claim 8, characterized in that both guide means are constructed as triangular guide members.

10. A wheel suspension according to claim 8, characterized in that the guide means extend in substantially the same direction in relation to the longitudinal direction of the vehicle.

11. A wheel suspension according to claim 8, characterized in that said guide means extend in substantially opposite directions in relation to the longitudinal direction of the vehicle.

12. A wheel suspension according to claim 8, characterized in that in relation to the longitudinal direction of the vehicle, the lower guide means is provided as forward guide member.

13. A wheel suspension according to claim 12, characterized in that, in relation to the longitudinal direction of the vehicle, the upper guide means is provided as rear guide member.

14. A wheel suspension according to claim 13, characterized in that the track rod means is pivotally connected at the lower guide means.

15. A wheel suspension according to claim 13, characterized in that the track rod means is pivotally connected at the upper guide means.

16. A wheel suspension according to claim 13, characterized in that the axis of rotation of the forward, lower guide means extends obliquely downwardly toward the vehicle longitudinal center plane, as viewed in rear view.

17. A wheel suspension according to claim 16, characterized in that the axis of rotation of the forward, lower guide means extends obliquely rearwardly toward the vehicle longitudinal center plane, as viewed in plan view.

18. A wheel suspension according to claim 17, characterized in that the axis of rotation of the rear, upper guide means extends obliquely forwardly toward the vehicle longitudinal center plane, as viewed in plan view.

19. A wheel suspension according to claim 18, characterized in that the axis of rotation of the rear, upper guide means extends obliquely downwardly toward the vehicle longitudinal center plane, as viewed in rear view.

20. A wheel suspension according to claim 19, characterized in that the points of pivotal connection of the forward guide means and the points of pivotal connection of the rear guide means are arranged respectively at a common bearer means.

21. A wheel suspension for a vehicle with a floor group according to claim 20, characterized in that the respective bearer means is constituted by a reinforcement of the floor group.

22. A wheel suspension according to claim 18, characterized in that the point of pivotal connection of the track rod means at the track link steering lever means is located, as viewed in plan view, at a larger distance from the vehicle longitudinal center plane than the point of pivotal connection of said one guide means at the wheel carrier means.

23. A wheel suspension according to claim 18, characterized in that the point of pivotal connection of the track rod means at the track link steering lever means is pivotally connected, as viewed in plan view, at a smaller distance from the vehicle longitudinal center plane than the point of pivotal connection of said one guide means at the wheel carrier means.

24. A wheel suspension according to claim 1, characterized in that the point of pivotal connection of said one guide means at the wheel carrier means is located at least approximately at the height of the pivotal connection of the track rod means at the track link steering lever means.

25. A wheel suspension according to claim 1, characterized in that the point of pivotal connection of the track rod means at the track link steering lever means and the point of pivotal connection of said one guide means at the wheel carrier means are located at essentially the same height.

26. A wheel suspension according to claim 1, characterized in that the point of pivotal connection of the track rod means at the track link steering lever means and the point of pivotal connection of said one guide means at the wheel carrier means are located substantially in a single vehicle transverse plane.

27. A wheel suspension according to claim 26, characterized in that the point of pivotal connection of said one guide means at the wheel carrier means is located at least approximately at the height of the pivotal connection of the track rod means at the track link steering lever means.

28. A wheel suspension according to claim 1, characterized in that the point of pivotal connection of the track rod means at said one guide means is located on said straight line.

29. A wheel suspension according to claim 3, characterized in that at least one of said guide means is constructed as triangular guide member.

30. A wheel suspension according to claim 3, characterized in that both guide means are constructed as triangular guide members.

31. A wheel suspension according to claim 3, characterized in that the guide means extend in substantially the same direction in relation to the longitudinal direction of the vehicle.

32. A wheel suspension according to claim 3, characterized in that said guide means extend in substantially opposite directions in relation to the longitudinal direction of the vehicle.

33. A wheel suspension according to claim 3, characterized in that, in relation to the longitudinal direction of the vehicle, the lower guide means is provided as forward guide member.

34. A wheel suspension according to claim 3, characterized in that, in relation to the longitudinal direction of the vehicle, the upper guide means is provided as rear guide member.

35. A wheel suspension according to claim 3, characterized in that the track rod means is pivotally connected at the lower guide means.

36. A wheel suspension according to claim 3, characterized in that the track rod means is pivotally connected at the upper guide means.

37. A wheel suspension according to claim 3, characterized in that the axis of rotation of the forward, lower guide means extends obliquely downwardly toward the vehicle longitudinal center plane, as viewed in rear view.

38. A wheel suspension according to claim 3, characterized in that the axis of rotation of the forward, lower guide means extends obliquely rearwardly toward the vehicle longitudinal center plane, as viewed in plan view.

39. A wheel suspension according to claim 3, characterized in that the axis of rotation of the rear, upper guide means extends obliquely forwardly toward the vehicle longitudinal center plane, as viewed in plan view.

40. A wheel suspension according to claim 39, characterized in that the axis of rotation of the rear, upper guide means extends obliquely downwardly toward the vehicle longitudinal center plane, as viewed in rear view.

41. A wheel suspension according to claim 39, characterized in that the axis of rotation of the forward, lower guide means extends obliquely downwardly toward the vehicle longitudinal center plane, as viewed in rear view.

42. A wheel suspension according to claim 41, characterized in that the axis of rotation of the forward, lower guide means extends obliquely rearwardly toward the vehicle longitudinal center plane, as viewed in plan view.

43. A wheel suspension according to claim 42, characterized in that the axis of rotation of the rear, upper guide means extends obliquely downwardly toward the vehicle longitudinal center plane, as viewed in rear view.

44. A wheel suspension according to claim 3, characterized in that the points of pivotal connection of the forward guide means and the points of pivotal connection of the rear guide means are arranged respectively at a common bearer means.

45. A wheel suspension for a vehicle with a floor group according to claim 44, characterized in that the respective bearer means is constituted by a reinforcement of the floor group.

46. A wheel suspension according to claim 1, characterized in that the point of pivotal connection of the track rod means at the track link steering lever means is located, as viewed in plan view, at a larger distance from the vehicle longitudinal center plane than the point of pivotal connection of said one guide means at the wheel carrier means.

47. A wheel suspension according to claim 1, characterized in that the point of pivotal connection of the track rod means at the track link steering lever means is pivotally connected, as viewed in plan view, at a smaller distance from the vehicle longitudinal center plane than the point of pivotal connection of said one guide means at the wheel carrier means.

* * * * *